July 7, 1942.  P. S. DENNING  2,289,250
MANUFACTURE OF INSULATING MATERIAL
Original Filed Jan. 14, 1939
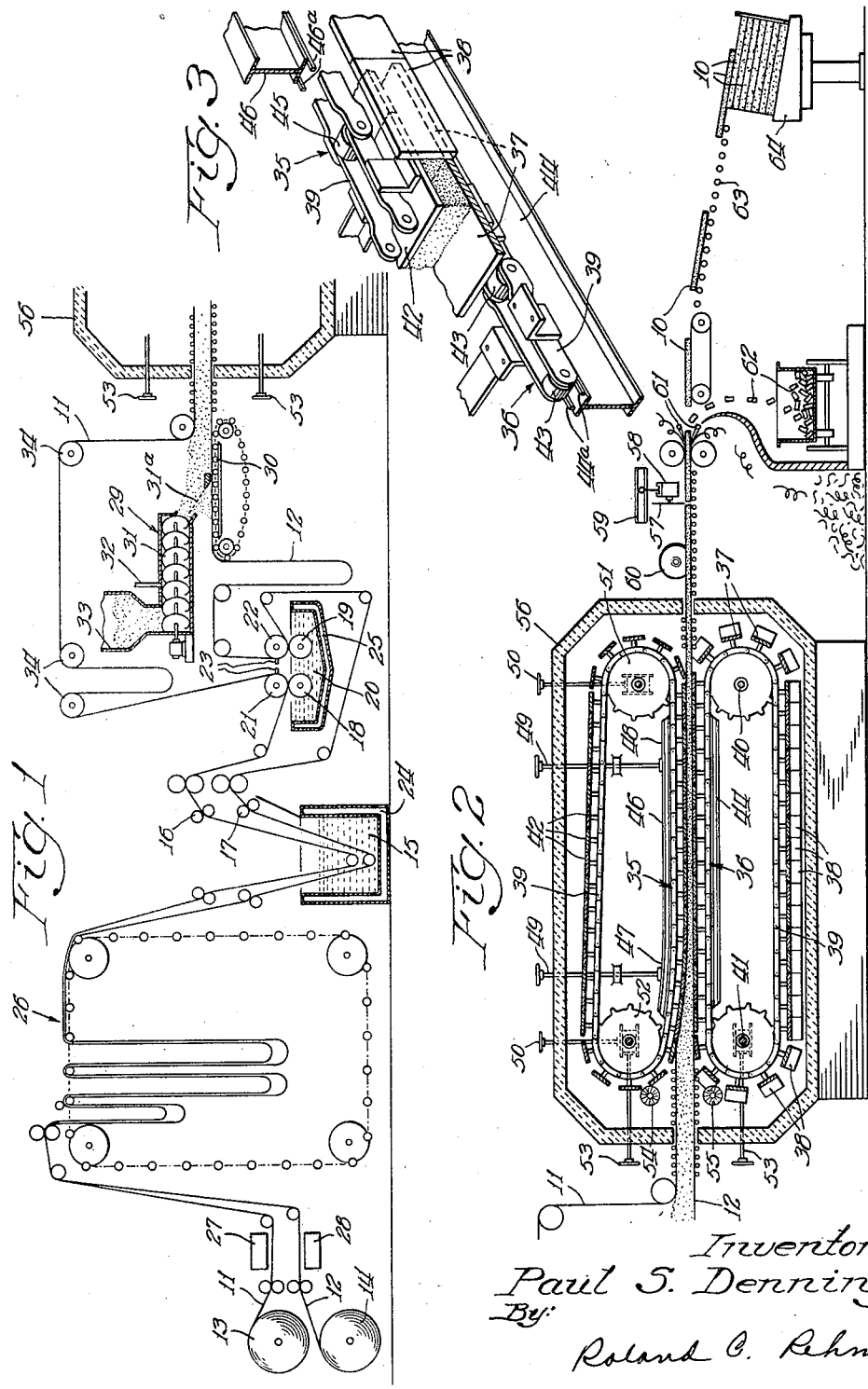
Inventor:
Paul S. Denning
By: Roland C. Rehm
Atty.

Patented July 7, 1942

2,289,250

UNITED STATES PATENT OFFICE 2,289,250

MANUFACTURE OF INSULATING MATERIAL

Paul S. Denning, Joliet, Ill., assignor to F. E. Schundler & Co., Inc., Joliet, Ill., a corporation of Illinois Original application January 14, 1939, Serial No. 250,892. Divided and this application November 12, 1940, Serial No. 365,375

5 Claims. (Cl. 18—48)

This invention relates to moisture-proof insulating material and its manufacture, and, among other objects, aims to provide insulating material of this character having high insulating efficiency and the qualities which adapt the material for use in insulating roofs and other structures.

The invention may be readily understood by reference to one illustrative method embodying the invention and described in the specification. The inventive method is further illustrated in the drawing in connection with apparatus for practicing the method.

In said drawing:

Fig. 1 is an elevation in diagrammatic form of the apparatus for forming the insulating material;

Fig. 2 is a similar view of apparatus for compressing and cooling the formed material and, in this instance, constitutes simply a continuation of the apparatus illustrated in Fig. 1; and Fig. 3 is a perspective view of details of the forming apparatus.

Heretofore condensation of moisture inside an insulating board or slab has resulted in deterioration or substantial impairment of its insulating efficiency. Insulation of vegetable origin, while efficient for low temperatures, deteriorates and loses its insulating efficiency in the presence of moisture which collects inside the insulating slab by condensation of the moisture carried in the air under the temperature differential between the faces of the insulating slab. Less efficient mineral insulating materials, while not subject to deterioration, also rapidly lose their insulating efficiency (which in many minerals is not high under favorable conditions) in the presence of moisture.

The illustrative insulating material (ex-foliated vermiculite) while of mineral character not only has initially an extremely high insulating efficiency but retains its insulating efficiency in the presence of moisture. Exfoliated vermiculite is an alteration product of particles of certain micaceous minerals, such as biotite which exfoliate or expand to many times their original size upon the application of heat to produce a granular material which is an extremely lightweight and efficient insulator. It has a very low heat absorbing capacity and is somewhat plastic. When exfoliated, the thin and polished laminae which characterize the material are very slightly separated (in the process of exfoliation), thereby forming a multitude of spaces which are capillary in character. Both the porous character of the vermiculite granules and the multitude of highly polished laminae function to give the exfoliated vermiculite its high insulating efficiency. The polished laminae function very effectively in retarding transfer of radiant heat. The high porosity of the granules of vermiculite gives them a capacity for absorbing and holding tremendous amounts of liquid; and unless absorption of liquid by the vermiculite can be prevented, the vermiculite can be prevented, the vermiculite also loses its insulating efficiency. To preserve its efficiency, it is necessary to prevent penetration of liquids into the spaces between the laminae.

The granules of vermiculite are bonded together in molded form, such as in the slab 10, by high melting point asphalt which lightly and superficially coats the granules but which does not substantially penetrate the voids. For present purposes a high melting point asphalt may be considered to be one which is solid or hard at ordinary temperatures. Such an asphalt has a melting point of about 220° F. A specific granule size is not essential but I have found that exfoliated vermiculite granules of minus six mesh form a satisfactory product.

The use of asphalt as a bonding and sealing material has presented substantial difficulties in the present material. Asphalt, when in molten condition, is more fluid even than water and ordinarily would readily penetrate the spaces between the laminae and could not be removed therefrom as water could by drying, thereby destroying the insulating efficiency of the product.

To render it adequately fluid for application, the asphalt is heated to about 450 to 500° F. and is mixed with the exfoliated vermiculite in apparatus which may, if necessary, be heated to a point which prevents the asphalt from adhering to the vessel or becoming viscous.

I have overcome the penetrating tendency of molten asphalt and have maintained the insulating efficiency of the vermiculite (1) by coating the granules of exfoliated vermiculite in relatively cool condition; and (2) by using a relatively small amount of high melting point asphalt. To make it possible to distribute a small amount of asphalt over a relatively large volume of granules (in this case the ratio by volume of asphalt to granules is about 1:6), I utilize the low heat absorbing capacity of the vermiculite granules. These granules, while sufficiently cool to congeal the very thin initial coating of asphalt have so little heat absorbing capacity that they do not chill the mass of asphalt to a point where the bulk of it is no longer highly fluid (only the thin initial film having been congealed), thereby making it possible to coat superficially a relatively large volume of granules with a small amount of high melting point asphalt. The congealing of the initial very thin coating of asphalt seals the granules and blocks penetration of the fluid asphalt into the interior of the granules. The granules thus retain their insulating efficiency.

The importance of low heat absorbing capacity is well illustrated by what would occur if porous aggregates having a relatively high heat absorbing capacity be used. They would congeal a prohibitively thick layer of asphalt and also cool the asphalt quickly to a viscous state.

It is possible to coat a given volume of exfoliated vermiculite granules with very much less asphalt than if a material of higher specific heat were used. The resulting product is, therefore, much lighter than any other asphalt coated mineral and sufficiently light to be commercially practical. Without these conditions it would be impossible to coat and bond the material with such a small amount of asphalt.

After distribution in the molds, the coated granules are slightly compressed to increase their bonding contact. The pressure is maintained until the asphalt has cooled sufficiently and set to develop a good bond which holds the material in its compressed condition.

By means of the foregoing method it is possible to bond together an efficient insulating aggregate with much less asphalt than has heretofore been required. Indeed, heretofore so much asphalt has been required as to make the material excessively heavy and of such low insulating efficiency as to have no commercial value.

While the volume of the granules placed in a mold is reduced about 30% on compression, this reduction of volume is brought about mainly by reduction in the voids between the granules and not by substantially compressing the granules. However, contrary to what occurs upon compression of other insulating materials, the asphalt coated vermiculite material may be compressed without seriously reducing its insulating efficiency but with a very substantial increase in the strength of the slabs. A compression as high as 700 pounds per square foot may be employed to advantage, although compression as high as this is not necessary for purposes of strength where the slabs are provided with facing sheets. The plasticity of the vermiculite granule makes it possible to secure a much more extensive bonding contact than is possible with other porous aggregates, with the result that adequate strength can be obtained with a surprisingly small amount of asphalt.

If desired, the molded material may be faced on one or both faces with fibrous sheets, such as water-proofed roofing paper or felt. The edges of the boards or slabs are preferably not covered so as to permit the exposed granules at the contiguous edges of boards or slabs to bond together after installation.

The boards or slabs may be made to any desired thickness. Slabs for roofing construction should preferably be about two inches thick so as to provide adequate insulation.

The resulting slab, in addition to its high insulating efficiency and moisture resisting qualities, weighs about 50% less than slabs made of other mineral insulating materials. Apparently other mineral insulating materials, by reason of their higher specific heat and different structure, absorb substantially greater volumes of asphalt than exfoliated vermiculite and, therefore, have a substantially lower insulating efficiency.

In the drawing is illustrated diagrammatically one form of method and apparatus for making a molded slab 10 having facing sheets on both surfaces. The facing sheets 11 and 12 are advantageously supplied from rolls 13 and 14 and are conducted through a saturating tank 15 containing material such as heated low melting point asphalt, which saturates the sheets and preserves them against deterioration. After passing through squeezing rolls 16 and 17, whose function is to express surplus saturant, the sheets are coated on their inner faces with asphalt in heated condition to provide a strong bond between the granules and the sheets. It is preferable that this asphalt be more tacky and less brittle (when cool) than that employed to coat the granules. At ordinary temperatures it is somewhat flexible. When applied it is not heated to such high temperatures so as to insure a heavier coating on the sheets than is applied to the granules. The coating apparatus in this instance comprises coating rolls 18 and 19 which are partly submerged in a tank 20 of coating asphalt. Other rolls 21 and 22 guide the sheets into contact with the coating rolls from which a coating is transferred to the inner faces of the sheets. Scrapers 23 remove surplus coating material and serve to provide a coating of uniform thickness.

The tanks 15 and 20 may advantageously be heated to the desired temperatures by gas flames or they may be heated by hot oil jackets 24 and 25.

At some stage in their travel the sheets preferably pass through festooning apparatus 26 which may be of conventional design, by which enough slack is accumulated to prevent interruption of the apparatus during the interval of changing rolls and splicing the fresh sheet to the end of the preceding sheet. Splicing apparatus 27 and 28 of conventional design is advantageously provided for facilitating splicing of the sheets.

The lower sheet 12 is caused to pass around the coating apparatus in such a way as to present its upper face to the coating roll 19. Thereafter the sheet is disposed to receive the coated granules from the mixing apparatus 29. In the present instance, the sheet travels across a conveyer 30 so as to present a flat horizontal surface for the granules.

The mixing apparatus is here shown in the form of a ribbon mixer, that is, one having a motor-driven spiral ribbon 31 adapted gently to mix the granules and the asphalt and to discharge them uniformly from the apparatus. The granules are initially relatively much cooler than the asphalt and, therefore, congeal a very thin sealing film of asphalt on their surface. The remaining asphalt is quite fluid and remains so until it has been uniformly distributed over the granules. A mixing time of twenty seconds in this type of mixer is in most instances adequate to coat the granules. The heated asphalt is supplied at a regulated rate to the mixer by any appropriate means, as through a pipe 32 leading from a heated vessel (not shown) containing the asphalt. The granules are advantageously supplied from a hopper 33 which discharges into the mixer at a rate which is determined by the rotation of the mixer.

As the coated granules issue from the mixer, they are distributed uniformly over the bottom sheet, the oily condition of the asphalt at this stage of the process facilitating distribution of the granules in a fairly uniform layer. A plurality of arms 31ᵃ diverging from the outlet of the mixer assist in laterally spreading the granules on the lower sheet 12. Thereupon the top sheet 11 is applied to the aforesaid layer of granules, the coating on its inner face having been maintained by heated rolls 34 in the tacky condition necessary for a good bond with the granules.

Thereafter pressure is applied to the material to bond the granules adequately together and to the coated upper and lower sheets. The pressure applying apparatus is here shown in the form of upper and lower endless belts 35 and 36 which are designed to constitute molding means for shaping the material. The lower belt 36 comprises a plurality of flat sections 37 having end flanges 38 which form the sides of the mold, when they lie in close juxtaposition along the upper run of the belt. The sections are carried on endless conveyor chains 39 which travel over driving and take-up pulleys 40 and 41. The upper belt 35 is generally similar to the lower belt except that its sections 42 are plain and are not provided with end flanges. They are of such a length as to pass between the end flanges 38 of the lower belt, so that the layer of material may be compressed to the desired thickness. The rolls 43 of the lower conveyer chain 39 travel over rails 44 which support the upper run of the belt against the pressure imposed on the material. The rolls 45 of the upper belt conveyer chain travel below the rails 46 by means of which gradual compression of the material is effected. Lateral guiding of the conveyer rolls 43 and 45 (to maintain registry between the upper and lower mold sections) is effected by guiding flanges 44ᵃ and 46ᵃ on the lower and upper rails respectively.

Rails 46 in this instance are slightly upwardly curved at their forward ends 47 to cause the upper belt gradually to approach the lower belt and to compress the layer gradually to the desired bonding contact and to uniform thickness. The latter portions 48 of the rails are advantageously parallel to the lower belt so as to maintain the material at a uniform thickness when it has been compressed. Pressure regulators in the form of pressure screws 49 are provided for adjusting the forward and trailing ends of the pressure rails 46. Screws 50 are provided for adjusting the conveyer rolls 51 and 52 to regulate the final thickness of the form slab and to adjust the diverging angle of the belts to the initial thickness of the layer of material. Take-up screws 53 are provided for removing excessive slack in the upper and lower belts.

Rotating brushes 54 and 55 may advantageously be employed to distribute talc over the working faces of the mold sections to prevent adhesion of the facing sheets or the coated granules thereto.

During the travel of the material through the compressing apparatus, it is advantageously cooled to harden the asphalt sufficiently to prevent substantial expansion of the formed slab after pressure has been released. To hasten the cooling and to permit of the use of a relatively short compressing apparatus (while maintaining a satisfactory speed of travel through the apparatus) the latter may be provided with a chilled atmosphere. As here shown, the compressing and gauging apparatus is surrounded by an insulating housing 56 into which is introduced refrigerated air cooled to such temperatures as will effect adequate cooling of the material. In one illustrative process, if the atmosphere inside the compressing apparatus be held at a temperature of about 10° F. and the material is caused to travel through the apparatus at the rate of seven feet per minute, it will issue at a temperature of approximately 140° F., and will be in such condition that it may be subsequently cut to size and handled.

In the present apparatus, the continuous slab of material is transversely severed at predetermined points without interrupting its continuous travel. Any appropriate cutting means may be used. I have here shown a rotating knife or saw 57 which is caused periodically to travel across the sheet in such a direction as to have a component of travel longitudinal of the sheet equal to the rate of travel of the material, thereby making a straight cut across the material. In the present instance, the saw together with its driving motor 58 is mouted to travel on a track 59 whose position is adjusted to provide the aforesaid component of travel. The knife is advantageously kept hot during its cutting action to avoid adhesion of the asphalt thereto. Knives without teeth are preferable to saws. Preferably the material is trimmed by edging knives or saws 60 which trim off from ⅜″ to ½″ along each side of the molded slab to remove defects, such as inadequately filled edges. The edging knives likewise are advantageously kept hot to prevent adhesion of the asphalt thereto. The material trimmed from the edges is advantageously advanced to knives 61 which strip off the strips of facing paper or felt in order to permit the recovery of the waste fragments 62 of coated granules. These are returned to the mixer and used again. Thereafter the finished slabs 10 cut to size may be handled in any appropriate way. In the present instance they travel down a conveyer 63 to an automatic stacker 64 which periodically lowers itself to receive and stack successive slabs.

When the slabs are used in roofing construction, roofing felt together with the usual mopping of tar or asphalt is applied to form the roof surface. A roof constructed in this way not only provides superior insulation but a roof equal in weather and moisture resisting qualities to the best five ply roof on the market. The use of exfoliated vermiculite instead of roofing felt as a vehicle, permits the use of a much superior quality of asphalt, thereby giving to the roofing correspondingly improved weather and moisture resisting qualities.

The material may be sealed against passage of moisture from one face to the other simply by increasing the pressure thereon sufficiently to close any voids which pass entirely through the slab. In practice compression which reduces the initial thickness by one-half will produce a satisfactorily sealed product. For example, an initial layer of one inch in thickness is compressed to produce a final product of ½ inch in thickness. The facing sheets not only aid in preventing moisture penetration but bond well with plaster applied to the board.

Thick slabs are not necessary; boards of ½ inch in thickness possess adequate strength. When used in a wall or the like, they serve both as a plaster base or lath and a seal to prevent penetration of moisture. In insulated walls the dew point (i. e. the point at which the moisture condenses) usually occurs inside the wall where it may damage the insulation and penetrate the plaster. A board of the type above described possesses a sufficiently high insulating value to throw the dew point beyond its outer face, yet it absolutely prevents penetration of moisture to the interior and consequent damage to the plaster or other wall covering. Moreover it is neither deteriorated nor impaired in insulating efficiency by the presence of moisture.

This application is a continuation in part of my copending application, Serial No. 71,303, filed March 27, 1936, and a division of my copending application, Serial No. 250,892, filed January 14, 1939.

Obviously the invention is not limited to the details of the illustrative process or apparatus since these may be variously modified. Moreover it is not indispensable that all features of the invention be used conjointly since various features may be used to advantage in different combinations and sub-combinations.

Having described my invention, I claim:

1. In the method of making waterproof insulating material the steps comprising mixing granules of exfoliated vermiculite in relatively cool condition with high melting point asphalt heated to fluid condition, the amount of asphalt not substantially exceeding the amount necessary to coat the granules with a film of asphalt, the granules being sufficiently cool to congeal the initial film of asphalt contacting with the granules, thereby preventing substantial penetration of the fluid asphalt into the granules, continuing mixing until the granules are sealed with a film of asphalt, the vermiculite being of such low heat absorbing capacity as not to harden the asphalt during mixing.

2. In the method of making waterproof insulating material the steps comprising heating until fluid high melting point asphalt which is hard at ordinary temperatures, mixing the asphalt in fluid condition with a much larger volume of granules of exfoliated vermiculite which are relatively much cooler than the asphalt, said granules congealing the initial film of asphalt contacting therewith to prevent penetration of the asphalt into the granules, the heat absorbing capacity of said granules being so low as to congeal only a thin initial film, thereby leaving the remainder of the asphalt fluid to coat other granules, the amount of asphalt not substantially exceeding the amount necessary to coat the granules with a film of asphalt.

3. In the method of making waterproof insulating material the steps comprising heating an asphaltic composition which is substantially hard in the range of temperatures to which the finished insulating material will be subjected in its intended use to a degree of fluidity sufficient to enable the fluid composition to penetrate the interstices between the laminae of granules of exfoliated vermiculite, mixing a relatively small quantity of such heated composition with a relatively large quantity of such granules while the granules are sufficiently cool to absorb sufficient heat from the composition to congeal the composition on the outer surfaces of the granules without substantially penetrating into the interstices between the laminae thereof, whereby a thin coating of solidified composition is deposited on the granule surfaces and the major portions of the interstices remain as voids, and controlling the proportion of composition to granules to make the surface coating substantially just thick enough to bond adjacent contacting coated granules together upon complete hardening of the composition.

4. The method of making waterproof insulating material which comprises mixing granules of exfoliated vermiculite in relatively cool condition with high melting point asphalt heated to fluid condition, the amount of asphalt not substantially exceeding the amount necessary to coat the granules with a film of asphalt, the granules being sufficiently cool to congeal the initial film of asphalt contacting with the granules, thereby preventing substantial penetration of the fluid asphalt into the granules, continuing mixing until the granules are sealed with a film of asphalt, the vermiculite being of such low heat absorbing capacity as not to harden the asphalt during mixing, then while the asphalt is still soft compressing the mixture so as not substantially to compress the granules but so as to bring the granules into such close bonding contact by reducing the voids between the granules that the surface coating of asphalt around the granules can function efficiently to bond the granules together, cooling the material to harden the asphalt, and maintaining the material in compressed condition during cooling to maintain the bonding contact of the granules.

5. A method of making waterproof insulating slabs which comprises coating a large volume of granules of exfoliated vermiculite by mixing the same in relatively cool condition with a relatively small volume of high melting point asphalt heated to a highly fluid condition, causing the relatively cool granules to congeal an initial sealing film thereon to prevent penetration of the asphalt into the granules, the granules having a low heat absorbing capacity so as not substantially to impair the fluid condition of the asphalt during mixing, compressing the mass of coated granules to reduce the voids between the granules without substantially compressing the granules to bring the granules into full contact so that the sealing film is able to function efficiently as a binder, and maintaining such compression until the asphalt has set so as to bond the granules permanently in their compressed condition.

PAUL S. DENNING.